United States Patent
McDonnell et al.

(10) Patent No.: US 10,540,681 B1
(45) Date of Patent: Jan. 21, 2020

(54) CORRELATING ONLINE AND OFFLINE CONVERSIONS WITH ONLINE CONVERSION IDENTIFIERS

(71) Applicant: Google Inc., Mountain View, CA (US)

(72) Inventors: Philip McDonnell, San Francisco, CA (US); Nemanja Pogarcic, New York, NY (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/704,897

(22) Filed: Sep. 14, 2017

Related U.S. Application Data

(63) Continuation of application No. 14/492,843, filed on Sep. 22, 2014.

(51) Int. Cl.
*G06Q 30/00* (2012.01)
*G06Q 30/02* (2012.01)
*G06Q 30/06* (2012.01)

(52) U.S. Cl.
CPC ..... *G06Q 30/0246* (2013.01); *G06Q 30/0633* (2013.01)

(58) Field of Classification Search
CPC .............. G06Q 30/0246; G06Q 30/0633
USPC ....................................................... 705/14.45
See application file for complete search history.

(56) References Cited

U.S. PATENT DOCUMENTS

| | | | |
|---|---|---|---|
| 8,296,383 B2 | 10/2012 | Lindahl | |
| 8,595,058 B2 * | 11/2013 | Fordyce, III | ........... G06Q 20/10 705/14.1 |
| 8,626,579 B2 | 1/2014 | Fordyce et al. | |
| 9,342,843 B2 | 5/2016 | Rosenshine | |
| 2004/0024632 A1 | 2/2004 | Perry | |
| 2011/0119132 A1 * | 5/2011 | Morton | ................... G06Q 30/02 705/14.53 |
| 2011/0231245 A1 | 9/2011 | Bhatia et al. | |
| 2011/0302024 A1 | 12/2011 | Gunawardana et al. | |
| 2012/0166272 A1 | 6/2012 | Wiley et al. | |
| 2012/0203572 A1 * | 8/2012 | Christensen | ........... G06Q 30/02 705/3 |
| 2015/0262221 A1 * | 9/2015 | Nakano | .............. G06Q 30/0246 705/14.45 |
| 2015/0348119 A1 | 12/2015 | Ferber et al. | |
| 2017/0092278 A1 | 3/2017 | Evermann et al. | |
| 2017/0110130 A1 | 4/2017 | Sharifi et al. | |

(Continued)

OTHER PUBLICATIONS

"Walmart and Google to offer voice-enabled shopping", BBC News, Aug. 23, 2017 (10 pages).

(Continued)

*Primary Examiner* — Azam A Ansari
(74) *Attorney, Agent, or Firm* — Foley & Lardner LLP

(57) ABSTRACT

Systems and methods of correlating an online content interaction with an offline content interaction are provided. A data processing system can identify an online conversion by a first computing device of a content item associated with a content provider, provide an online conversion identifier to an offline conversion identification unit, receive from the offline conversion identification unit detection data indicating that the offline conversion identification unit has detected the online conversion identifier on one of the first computing device and a second computing device, and provide the detection data to a content provider computing device associated with the content provider.

18 Claims, 4 Drawing Sheets

(56) References Cited

U.S. PATENT DOCUMENTS

2017/0110144 A1 4/2017 Sharifi et al.
2017/0132019 A1 5/2017 Karashchuk et al.
2017/0358301 A1 12/2017 Raitio et al.

OTHER PUBLICATIONS

Amazon, "Echo Look | Hands-Free Camera and Style Assistant", reprinted from https://www.amazon.com/gp/product/B0186JAEWK?ref%5F=cm%5Fsw%5Fr%5Ffa%5Fdp%5Ft2%5FC5oazbJTKCB18&pldnSite=1 on Aug. 22, 2017 (7 pages).
Barr, Google Tests aWay to Follow You to the Mall, Apr. 2014.
Broussard, Mitchel, "Chatbot-Like Siri Patent Includes Intelligent Image, Video, and Audio Recognition within Messages", MacRumors, May 11, 2017 (7 pages).
Chen, Lulu Yilun, "Alibaba Challenges Google, Amazon With New Echo-Like Device", Bloomberg Technology, Jul. 5, 2017 (3 pages).
Clover, Juli, "Amazon and Google Want to Turn Their Smart Home Speakers Into Telephone Replacements", MacRumors, Feb. 15, 2017 (5 pages).
Collins, et al., "Can Twitter Save Itself?", cnet, Apr. 26, 2017, reprinted from https://www.cnet.com/news/twitter-q1-2017-earnings/ on Aug. 22, 2017 (2 pages).
Crist, Ry, "Logitech Harmony's Alexa Skill just got a whole lot better", cnet, Jul. 13, 2017 (2 pages).
Forrest, Conner, "Essential Home wants to be bridge between Amazon's Alexis, Apple's Siri, and Google Assistant", TechRepublic, May 31, 2017 (10 pages).
Foxx, Chris, "Apple reveals HomePod smart speaker", BBC News, Jun. 5, 2017 (6 pages).
Gebhart, Andrew, "Google Assistant is spreading, but it needs its own Echo Dot", cnet, May 20, 2017 (7 pages).
Gebhart, Andrew, "Google Home to the Amazon Echo: 'Anything you can do . . . '", cnet, May 18, 2017 (7 pages).
Gibbs, Samuel, "Your Facebook Messenger app is about to be filled with ads", The Guardian, Jul. 12, 2017 (3 pages).
Golgowski, Nina, "This Burger King Ad Is Trying to Control Your Google Home Device", Huffpost, Apr. 12, 2017 (7 pages).
Google Developers, "GoogleAssistant SDK" reprinted from https://developers.google.com/assistant/sdk/ on Aug. 22, 2017 (4 pages).
Gurma, et al., "Apple Is Manufacturing a Siri Speaker to Outdo Google and Amazon", Bloomberg, May 31, 2017 (5 pages).
Hardwick, Tim, "Facebook Smart Speaker Coming Next Year With 15-inch Touch Panel", MacRumors, Jul. 25, 2017 (5 pages).
Kelion, Leo, "Amazon's race to make Alexa smarter", BBC News, Jul. 28, 2017 (8 pages).
Koetsier, John, "Ads on Amazon Echo: Wendy's, ESPN, and Progressive Among Brands Testing", Forbes, May 11, 2017 (2 pages).
Larson, Selena, "Google Home now recognizes your individual voice", CNN Money, San Francisco, California, Apr. 20, 2017 (3 pages).
Lee, Dave, "The five big announcements from Google I/O", BBC News, May 18, 2017 (9 pages).
Nieva, Richard, "Google Home and eBay can tell you how much that's worth", cnet, Mar. 8, 2017 (3 pages).
Patently Apple, "Apple Patent Reveals a New Security Feature Coming to Siri", Apr. 4, 2017, reprinted from http://www.patentlyapple.com/patently-apple/2017/04/apple-patent-reveals-a-new-security-feature-coming-to-siri.html, on Aug. 22, 2017 (6 pages).
Patently Apple, "Today Google Home's Virtual Assistant can learn its Owner's voice for Security Reasons like Apple's Patent Pending Idea", Apr. 20, 2017, reprinted from http://www.patentlyapple.com/patently-apple/2017/04/today-google-homes-virtual-assistant-can-learn-its-owners-voice-for-security-reasons-like-apples-patent-pending-idea.html on Aug. 22, 2017 (4 pages).
Patently Mobile, "The Patent behind Google Home's new Feature of Understanding Different Voices in the Home Surfaced Today", Apr. 20, 2017, reprinted from http://www.patentlymobile.com/2017/04/the-patent-behind-google-homes-new-feature-of-understanding-different-voices-in-the-home-surfaced-today.html, on Aug. 22, 2017 (3 pages).
Perez, Sarah, "The first ad network for Alexa Skills shuts down following Amazon's policy changes", Tech Crunch, Jun. 15, 2017 (6 pages).
Porter, Jon, "Amazon Echo Show release date, price, news and features", Techradar, Jun. 26, 2017 (14 pages).
Ramaswamy, Estimated Total Conversions: New insights for the multi-screem world, Oct. 2013.
Sablich, Justin, "Planning a Trip With the Help of Google Home", New York Times, May 31, 2017 (6 pages).
Seifert, Dan, "Samsung's new virtual assistant will make using your phone easier", The Verge, Mar. 20, 2017 (6 pages).
Sherr, Ian, "IBM built a voice assistant for cybersecurity", cnet, Feb. 13, 2017 (2 pages).
Siegal, Daniel, "IP Attys Load Up Apps' Legal Challenges At 'Silicon Beach'", Law360, Los Angeles, California, Feb. 2, 2017 (4 pages).
Smith, Dave, "The Amazon Echo got 2 incredibly useful features thanks to a new update", Business Insider, Jun. 1, 2017 (5 pages).
U.S. Office Action on U.S. Appl. No. 14/492,843 dated Jun. 28, 2017, 23 pages.
U.S. Office Action on U.S. Appl. No. 14/492,843 dated Mar. 10, 2017, 21 pages.
Willens, Max, "For publishers, Amazon Alexa holds promise but not much money (yet)", Digiday, Jul. 6, 2017 (6 pages).
Abrams, Help users find, interact & re-engage with your app on the Google Assistant, Google Developers Blog, Nov. 15, 2017, 16 pages.
Albrecht, "Alexa, How Can You Be Used in Restaurants?", the spoon, Dec. 10, 2017, 6 pages.
Barr, "AWS DeepLens—Get Hands-On Experience with Deep Learning With Our New Video Camera", AWS News Blog, Nov. 29, 2017, 11 pages.
Coberly, "Apple patent filing reveals potential whispering Siri functionality", Techspot, Dec. 14, 2017, 4 pages.
Estes, "Amazon's Newest Gadget Is a Tablet That's Also an Echo", Gizmodo, Sep. 19, 2017, 3 pages.
Foghorn Labs, 10 Tips to Improve the Performance of Google Product Listing Ads, printed from Internet address: http://www.foghornlabs.com/2012/11/21/product-listing-ads-best-practices/, on Mar. 18, 2013, 5 pages.
Google Inc., Products Feed Specification, printed from Internet address: http://www.support.google.com/merchants/bin/answer.py?hl=en&answer=188494#US, on Mar. 18, 2013, 6 pages.
Google Inc., Supported File Formats, printed from Internet address: http://www.support.google.com/merchants/bin/answer.py?hl=en&answer=160567, on Mar. 18, 2013, 1 page.
Heater, "Amazon Alexa devices can finally tell voices apart", TechCrunch, Oct. 11, 2017, 6 pages.
Johnston, "Amazon Whirlwind: New Echo, Plus, Spot, Connect, Fire TV Take the Stage", Twice, Sep. 27, 2017, 4 pages.
Kelion, "Amazon revamps Echo smart speaker family", BBC News, Sep. 27, 2017, 11 pages.
Krishna, "Jim Beam's smart decanter will pour you a shot when you ask", engadget, Nov. 29, 2017, 3 pages.
Lacy, "Improving search and advertising are the next frontiers for voice-activated devices", TechCrunch, Dec. 20, 2017, 13 pages.
Lee, Take Two for Samsung's troubled Bixby assistant, BBC News, Oct. 19, 2017, 6 pages.
Lund, Pamela, Mastering Google Product Feeds and Product Listing Ads $2013 Part 1, found at http://www.blueglass.com/blog/mastering-google-product-feeds-and-product-listing-ads-part-1/#comments, Dec. 28, 2013, 17 pages.
Novet, et al., "Amazon is getting ready to bring Alexa to work", CNBC, Nov. 29, 2017, 4 pages.
Palladino, "Garmin teamed up with Amazon to make a tiny Echo Dot for your car", ars Technica, Oct. 17, 2017, 2 pages.
Perez, "Alexa's 'Routines' will combine smart home control with other actions, like delivering your news and weather", TechCrunch, Sep. 28, 2017, 10 pages.

(56) References Cited

OTHER PUBLICATIONS

Pringle, "'I'm sorry to hear that': Why training Siri to be a therapist won't be easy", CBC News, Sep. 24, 2017, 3 pages.
Unknown Author, "'Dolphin' attacks fool Amazon, Google voice assistants", BBC News, Sep. 7, 2017, 8 pages.
U.S. Office Action on U.S. Appl. No. 14/492,843 dated Dec. 13, 2017, 19 pages.
Buckland et al., "Amazon's Alexa Takes Open-Source Route to Beat Google Into Cars", Bloomberg, Feb. 27, 2018, 6 pages.
Final Office Action on U.S. Appl. No. 14/492,843 dated Dec. 28, 2018.
Non-Final Office Action on U.S. Appl. No. 14/492,843 dated Jun. 19, 2018.

* cited by examiner

CORRELATING ONLINE AND OFFLINE CONVERSIONS WITH ONLINE CONVERSION IDENTIFIERS

CROSS-REFERENCES TO RELATED APPLICATIONS

This application claims the benefit of priority under 35 U.S.C. § 120 as a continuation of U.S. patent application Ser. No. 14/492,843, filed on Sep. 22, 2014, which is hereby incorporated by reference herein in its entirety.

BACKGROUND

In a computer networked environment such as the Internet, entities such as people or companies provide information for public display on web pages or other online documents. The documents can include information provided by the entities via a computing device for display on the Internet. Content can also be provided by third parties for display on the documents together with the information provided by the entities. Thus, a person viewing a document can access the information that is the subject of the document, as well as third party content that may or may not be related to the subject matter of the document.

SUMMARY

At least one aspect is directed to a system of correlating an online content interaction with an offline content interaction. The system can include a data processing system having an online conversion detection module and a correlation conversion module. The data processing system can receive, by the one or more processors, an online conversion identifier generated by a first computing device, the online conversion identifier corresponding to an interaction by the first computing device with a content item associated with a content provider. The data processing system can provide the online conversion identifier to an offline conversion identification unit disposed in a physical space associated with the content provider. The data processing system can receive, from the offline conversion identification unit, detection data indicating that the offline conversion identification unit has detected the online conversion identifier on one of the first computing device or a second computing device. The data processing system can provide the detection data to a content provider computing device associated with the content provider.

At least one aspect is directed to a computer implemented method of correlating an online content interaction with an offline content interaction. The method can include receiving, by the one or more processors, an online conversion identifier generated by a first computing device, the online conversion identifier corresponding to an interaction by the first computing device with a content item associated with a content provider. The method can include providing the online conversion identifier to an offline conversion identification unit disposed in a physical space associated with the content provider. The method can include receiving, from the offline conversion identification unit, detection data indicating that the offline conversion identification unit has detected the online conversion identifier of one of the first computing device or a second computing device. The method can include providing the detection data to a content provider computing device associated with the content provider.

At least one aspect is directed to a computer readable storage medium storing instructions that when executed by one or more data processors, cause the one or more data processors to perform operations. The operations can receive, by the one or more processors, an online conversion identifier generated by a first computing device, the online conversion identifier corresponding to an interaction by the first computing device with a content item associated with a content provider. The operations can provide online conversion identifier to an offline conversion identification unit disposed in a physical space associated with the content provider. The operations can receive, from the offline conversion identification unit, detection data indicating that the offline conversion identification unit has detected the online conversion identifier of one of the first computing device or a second computing device. The operations can provide, via the computer network, the detection data to a content provider computing device associated with the content provider.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
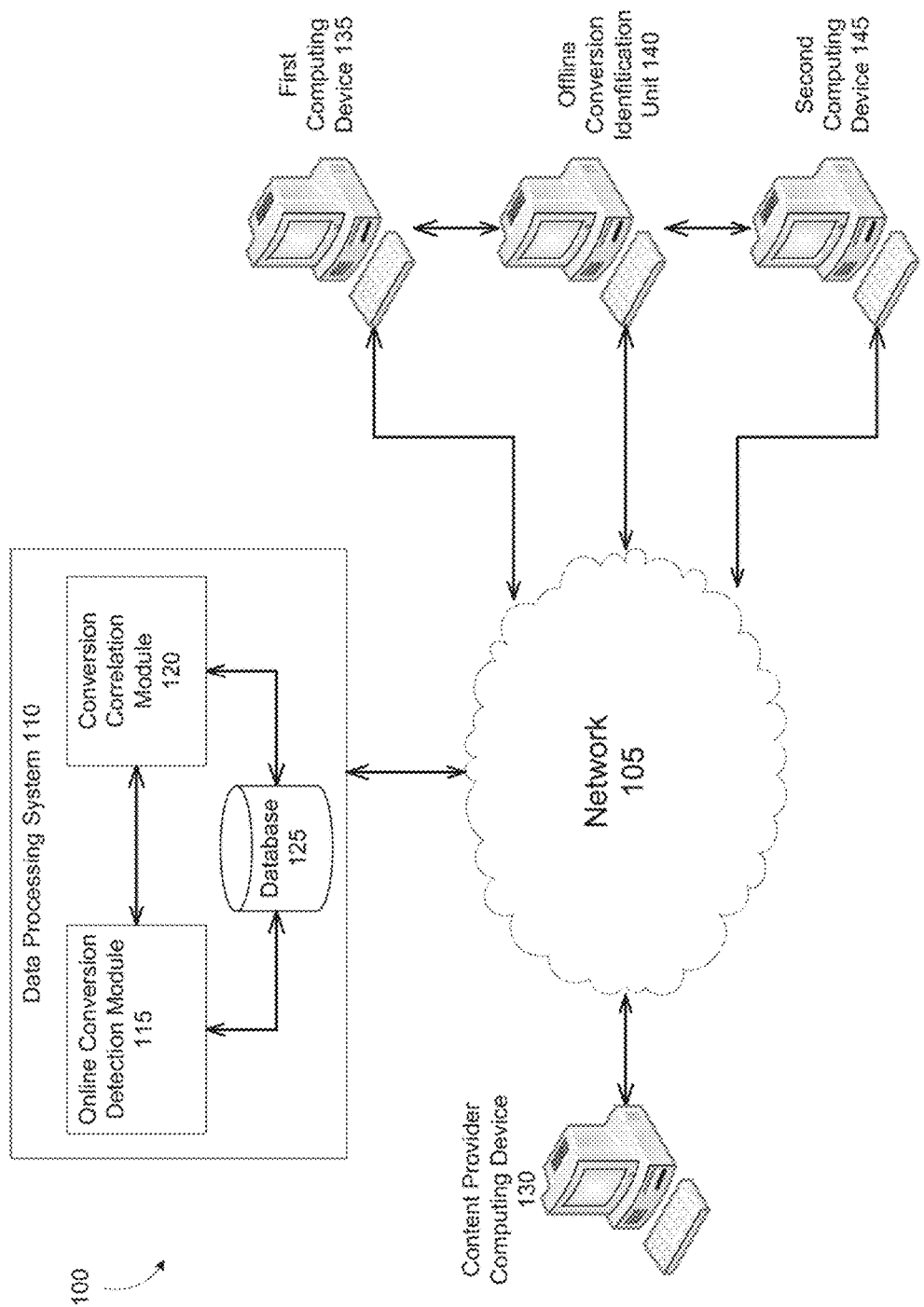
FIG. 1 is a block diagram depicting one example environment to correlate online conversions with offline conversions, according to an illustrative implementation.

Following below are more detailed descriptions of various concepts related to, and implementations of, methods, apparatuses, and systems for correlating online conversions with offline conversions. The various concepts introduced above and discussed in greater detail below may be implemented in any of numerous ways, as the described concepts are not limited to any particular manner of implementation.

Systems and methods of the present disclosure relate generally to supplying a content provider with information about offline activity related to online content produced by the content provider. For example, a computing device such as a personal computer, smartphone, or tablet can visit a web page (or other online document) maintained by a content publisher. The content publisher may include content items, such as advertisements, produced by the content provider. A data processing system associated with the content provider can identify interactions with the online content, and receive an online conversion identifier from the computing device. The data processing system can transmit the online conversion identifier to an offline conversion identification unit, which can store that data.

The offline conversion identification unit can initiate a wireless connection with a computing device, detect the online conversion identifier, and transmit detection data back to the data processing system. The offline conversion identification unit can be associated with a physical space, such as a retail location associated with the content provider. The offline conversion identification unit maintains a memory for storing the online conversion identifier. The offline conversion identification unit can initiate a wireless connection with a computing device in proximity to the physical space. If the computing device contains the online conversion identifier, the offline conversion identification unit can detect a match, and transmit detection data back to the data processing system. The data processing system can report the detection data to the content provider. The detection data can indicate to the content provider that an offline conversion, e.g., a visit to a retail location, is associated with or subsequent to an online interaction. The data processing system thus supplies the content provider with additional information regarding the effectiveness of its online content in generating conversions.

The data processing system can also provide more detailed information regarding the offline conversion, including whether a purchase occurred and what item, if any, was purchased. The offline conversion identification unit can be associated with, for example, a point-of-sale device such as a cash register or scanner. This association may be by proximity or by direct electrical or wireless connection. In this configuration, the offline conversion identification unit can generate more detailed detection data. For example, the offline conversion identification unit may be able to further detect that the computing device containing the online conversion identifier is within a predetermined distance of the point-of-sale device, indicating a possible inquiry or purchase. The offline conversion identification unit can associate the computing device with a particular transaction, including an item purchased.

The data processing system can also correlate online conversions performed with a first computing system with offline conversions associated with a second computing system. If the computing device that performed the online content interaction is linked to a second computing device, the data processing system can transmit the online conversion identifier to the second computing device. In one example, the first computing device could be a desktop computer, and the second computing device could be a mobile device. In this example, the desktop computer may perform the online content interaction. The data processing system can transmit the online conversion identifier to the offline conversion identification unit and also to the mobile device associated with the desktop computer. If the offline conversion identification unit detects the online conversion identifier on the second computing device, the data processing system can correlate the online conversion with the offline conversion despite each conversion being associated with a different computing device. Thus, the systems and methods described herein can provide the content provider with data on the effectiveness of online content in producing offline conversions, such as store visits and in-store purchases.

FIG. 1 illustrates an example system 100 correlating an online content interaction with an offline content interaction via at least one computer network, such as the network 105. The network 105 can include computer networks such as the Internet, local, wide, metro or other area networks, intranets, satellite networks, other computer networks such as voice or data mobile phone communication networks, and combinations thereof. The network 105 can include or constitute a display network, e.g., a subset of information resources available on the Internet that are associated with a content placement or search engine results system, or that are eligible to include third party content items as part of a content item placement campaign. The system 100 can also include at least one data processing system 110, for example at least one logic device such as a computing device or server having a processor to communicate via the network 105, for example with at least one content provider computing device 130, or at least one computing device 135.

The data processing system 110 can include at least one server. For example, the data processing system 110 can include a plurality of servers located in at least one data center or server farm. The data processing system 110 can include at least one online conversion detection module 115, at least one conversion correlation module 120, and at least one database 125. The online conversion detection module 115 and the conversion correlation module 120 can each include at least one processing unit, server, virtual server, circuit, engine, agent, appliance, or other logic device such as programmable logic arrays configured to communicate with the database 125 and with other computing devices (e.g., the content provider computing device 130 or the first computing device 135) via the network 105.

The online conversion detection module 115 and the conversion correlation module 120 can include or execute at least one computer program or at least one script. The online conversion detection module 115 and the conversion correlation module 120 can be separate components, a single component, or part of the data processing system 110. The online conversion detection module 115 and the conversion correlation module 120 can include combinations of software and hardware, such as one or more processors configured to execute one or more scripts to detect online conversions, detect offline conversions, and correlate the two for analysis by the content provider computing device 130, for example.

The content provider computing device 130 can include personal computers, servers, mobile computing devices, or other computing devices operated by a content provider to provide content for display via the network 105. For example, the content provider computing device 130 can include web-based advertisements for display on a web page (or other online document) via the network 105. The primary content of the online document can include content other than that provided by the content provider computing device 130, and the online document can include content slots configured for the display of the provided content items (e.g., ads). For example, a content publisher can operate the website of a company and can provide content about that company for display on web pages of the website. The web pages can include content slots configured for the display of the provided content items.

The computing devices 135 and 145 can include end user computing devices configured to communicate via the network 105 to display data such as the content provided by the content provider computing device 130 (e.g., ads) as well as primary content produced by a content publisher. The computing devices 135 and 145 can include desktop computers, laptop computers, tablet computers, smartphones, personal digital assistants, mobile devices, end user computing devices, consumer computing devices, servers, clients, and other computing devices. The computing devices 135 and 145 can include user interfaces such as displays, microphones, speakers, touchscreens, keyboards, pointing devices, a computer mouse, touchpad, or other input or output interfaces.

The data processing system 110 can include the online conversion detection module 115 or the conversion correlation module 120 as part of one or more servers of a correlation system to detect online conversions, receive offline conversion detection data from an offline conversion detection unit 140, and transmit the detection data to the content provider computing device 130.

The online conversion detection module 115 or the conversion correlation module 120 can be part of, or can include scripts executed by, one or more servers in the data processing system 110 (e.g., a correlation system) to identify an online conversion executed by a first computing device, provide online conversion identifier to the online conversion identification unit 140, receive detection data from the offline conversion identification unit 140, and provide detection data to the content provider computing device 130.

The system 100 can identify an online conversion made by the first computing device 135 via the network 105. For example, the data processing system 110 can identify, via the network 105, an online conversion executed on the first computing device 135 into an input or interface of a webpage or other online document. The online conversion can be a click, an item added to an online shopping cart, or an online purchase. The online conversion could include any other type of detectable online behavior including a mouse over or a scroll over. The online conversion can represent an interaction between the end user using the first computing device 135 and the content provided by the content provider computing device 130. The content can be an advertisement, link, embedded video, a Flash object, banner, pop-up, pixel, or any combination thereof.

When an online conversion is executed on the first computing device 135, an agent executing on the first computing device 135 generates an online conversion identifier that can be unique to the online conversion. The online conversion identifier need not include any personally identifying information about the first computing device 135, nor any user operating it. The online conversion identifier can, however, include non-personally identifying information that may be useful in evaluating the conversion, including one or more of a device type of the first computing device 135, an operating system running on the first computing device 135, an advertisement type associated with the online conversion, a keyword associated with the online conversion, a query associated with the online conversion, and a time of the online conversion. The agent can share the online conversion identifier with the operating system or an application executing on the first computing device 135. The operation system or the application can then cause the online conversion identifier to be transmitted to the data processing system 110.

The data processing system 110 can receive the online conversion identifier and provide it to the offline conversion identification unit 140. The offline conversion identification unit 140 can be disposed in a physical space; for example, a retail location associated with the content provider. For example, the content provider can represent a brand of consumer goods, and the retail location can be a store owned by the content provider, a franchise location, or any other type of store specializing in or carrying goods sold under that brand. The physical space can take the form of a stand-alone store, a store in a mall or shopping complex, a kiosk, a section of a larger store, a service window, or any other space where goods or services can be purchased, rented, or otherwise procured.

The offline conversion identification unit 140 can have a network interface for connecting to the network 105, a memory for storing the online conversion identifier, and a wireless receiver for detecting the online conversion identifier on a computing device 135 or 145 that comes within detection range. The memory can include a hard disk drive, a solid-state drive, FLASH memory, random access memory, cloud storage, etc., or any combination thereof. The offline conversion identification unit 140 can store the online conversion identifier in a look-up table, a database, an array of comma-separated values, or the like. The offline conversion detection unit 140 may store the online conversion identifier indefinitely, or for a limited time corresponding to the maximum period of interest of the content provider; for example, 30 days. The wireless receiver can use WiFi, Bluetooth™, or other appropriate wireless communication protocol to detect the presence of a computing device 135 or 145, and identify on it an online conversion identifier. The offline conversion identification unit 140 receives an online conversion identifier that is stored on the computing device 135 or 145 and compares them to the online conversion identifier stored in its own memory. If the offline conversion identification unit 140 detects a match, it transmits detection data back to the data processing system 110 via the network 105.

The data processing system 110 receives the detection data from the offline conversion detection unit 140 and provides the detection data to the content provider computing device 130 via the network 105. The data processing system 110 can transmit the detection data as raw data (i.e., basic information about the online conversion identifier plus the time, date, and location of the detection) to the content provider computing device 130. Additionally or alternatively, the data processing system 110 can collect and analyze detection data in aggregate, and transmit measurements, tables, summaries, graphs, or the like to the content provider computing device 130.

In some implementations, the offline conversion identification unit 140 can detect the online conversion identifier on a second computing device 145. In such an implementation, the online conversion may have been executed by the first computing device 135. The first computing device 135 can generate the online conversion identifier and transmit it to the data processing system 110. The data processing system 110 can transmit the online conversion identifier to the offline conversion identification unit 140, and additionally to the second computing device 145. The first computing device 135 and the second computing device 145 can be associated, for example, by a shared account login. That is, a user of the first computing device 135 can log into an account using the same username and password that a user, presumably the same user, of the second computing device 145 uses to log into an account. In this manner, the online conversion identifier need not include any personally identifying information regarding the user of either device; rather it is shared by virtue of a common account. In some implementations, the first computing device 135 connects directly with the second computing device 145, and transfers the online conversion identifier via that connection. In some implementations, the first computing device 135 transmits the online conversion identifier to the data processing system 110, which transmits it to the second computing device 145. In some implementations, the first computing device 135 transmits the online conversion identifier to the second computing device 145 via a third-party data processing system, computing device, server, or the like. If the second computing device 145 enters the physical space in which the offline conversion identification unit 140 is disposed, the offline conversion identification unit 140 can detect the online conversion identifier, even if the second computing device 145 was not the device with which the online conversion was executed.

In some implementations, the first computing device 135 can be a desktop computer and the second computing device 145 can be a mobile computing device. In such implementations a user of the first computing device 135 may browse a website or other online document, and interact with content such as an advertisement hosted by the website. The online conversion identifier can be transmitted to the data processing system 110. By virtue of a common account login on each computing device, the data processing system 110 can share the online conversion identifier with the second computing device 145. Because the second computing device 145 is a mobile computing device such as a mobile phone, personal digital assistant, or tablet, a user can carry it when visiting the physical space in which the offline conversion identification unit 140 is disposed. When the user enters the physical space, the offline conversion identification unit 140 can detect the presence of the online conversion identifier, identify the presence of the computing device 135 or 145 as an offline conversion, and transmit detection data back to the data processing system 110.

In some implementations, the physical space can include a retail location associated with the content provider. For example, the content provider can represent a brand of consumer goods, and the retail location can be a store owned by the content provider, a franchise location, or any other type of store specializing in or carrying goods sold under that brand. The physical space can take the form of a stand-alone store, a store in a mall or shopping complex, a kiosk, a section of a larger store, a service window, or any other space where goods or services can be purchased, rented, or otherwise procured. In some implementations, the offline conversion identification unit 140 can detect whether the computing device 135 or 145 is within a threshold distance. For example, the content provider may not be interested in cases where a computing device associated with an online conversion merely passed by a retail location. Rather, the content provider is interested in whether the computing device, and thus the user, actually enters the store.

In some implementations, the offline conversion identification unit 140 can establish a wireless connection with the computing device 135 or 145. The wireless connection can be over WiFi, Bluetooth™, or any other appropriate protocol. The offline conversion identification unit 140 can detect the presence of the computing device 135 or 145, and identify the presence of an online conversion identifier thereon. If the offline conversion identification unit 140 detects a match to the online conversion identifier stored in its memory, it can transmit detection data back to the data processing system 110.

In some implementations, the online conversion identifier can include one or more of a device type of the first computing device 135, an operating system running on the first computing device 135, an advertisement type associated with the online conversion, a keyword associated with the online conversion, a query associated with the online conversion, and a time of the online conversion. Such information may be useful in evaluating detection data resulting from the identification of the online conversion identifier from the offline conversion identification unit 140. The online conversion identifier can include information related to the first computing device 135; for example, the manufacturer and model, and the operating system running on it. The online conversion identifier can also include information related to the advertisement with which the first computing device 135 interacted, resulting in the online conversion. For example, whether the ad was a banner, a pop-up, a Flash ad, embedded video, or the like. In some cases, the advertisement is associated with the entry of a keyword or a query. In such cases, the online conversion identifier can include the keyword or the query. All of the information included in the online conversion identifier can be included in the detection data provided by the offline conversion identification unit 140.

In some implementations, the detection data can include one or more of a device type of the second computing device 145, an operating system running on the first computing device 145, an advertisement type associated with the online conversion, a keyword associated with the online conversion, a query associated with the online conversion, and a time of the online conversion. As above, such information may be useful in evaluating detection data resulting from the identification of the online conversion identifier from the offline conversion identification unit 140.

In some implementations, the detection data can indicate that the detection occurred within a certain interval of interest from the time of the online conversion; for example, 30 days. The content provider may believe that detection data related to an offline conversion that occurred too long after the online conversion is less useful in determining the effectiveness of the provided content. In some implementations, the offline conversion identification unit 140 can store in its memory an online conversion identifier for a predetermined period of time set by the content provider, e.g., 7, 10, or 30 days, after which it can be discarded. In other implementations, the data processing system 110 can disregard or ignore detection data returned from the offline conversion identification unit 140 if the detection data or the data processing system's 110 analysis show that the offline conversion occurred longer than a predetermined period of time after the online conversion.

Figure 2:
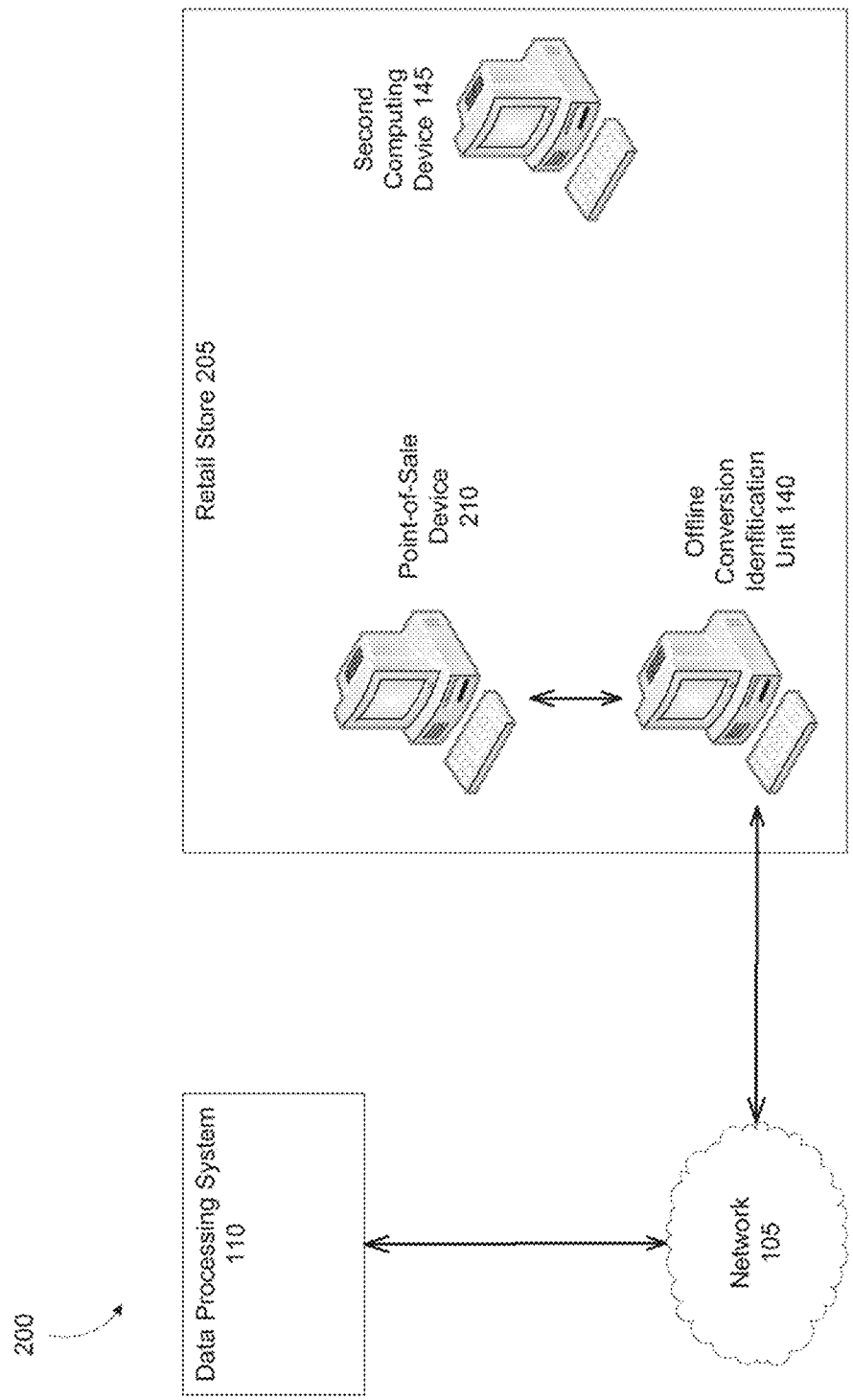
FIG. 2 is a block diagram depicting one example system for detecting an offline conversion, according to an illustrative implementation.

FIG. 2 illustrates a block diagram depicting one example system 200 for detecting an offline conversion. The offline conversion identification unit 140 is disposed within a physical space, represented in the figure by the retail store 205. In some implementations the offline conversion identification unit 140 is associated with a point-of-sale device 210. The association can be by mere proximity, or by wireless or electrical connection. The offline conversion identification unit 140 can connect to the second computing device 145 wirelessly by WiFi, Bluetooth™, or other wireless protocol, and identify an online conversion identifier that the second computing device 145 may have stored in its memory. If the offline conversion identification unit 140 detects an online conversion identifier that matches an online conversion identifier stored in its own memory, it can provide detection data back to the data processing system 110 via network 105. The offline conversion identification unit 140 can similarly detect an online conversion identifier on the first computing device 135 (not shown in FIG. 2).

In some implementations, the offline conversion identification unit 140 is associated with a point-of-sale device 210, such as a cash register, scanner, barcode reader, self-checkout lane, or the like. In such implementations, the offline conversion identification unit 140 can be configured to detect computing devices only within a relatively close proximity to the point-of-sale device; the close proximity indicating an inquiry or a possible purchase. In some implementations the offline conversion identification unit 140 maintains an electrical or wireless connection to the point-of-sale device, and can thereby receive additional information regarding any purchases made while the second computing device 145 is within close proximity to the point-of-sale device 210, and thus presumably possessed by the user making the purchase. Such additional information could include the number and type of items purchased, the total amount of the purchase, the payment method, or even a complete list of the items purchased.

Figure 3:
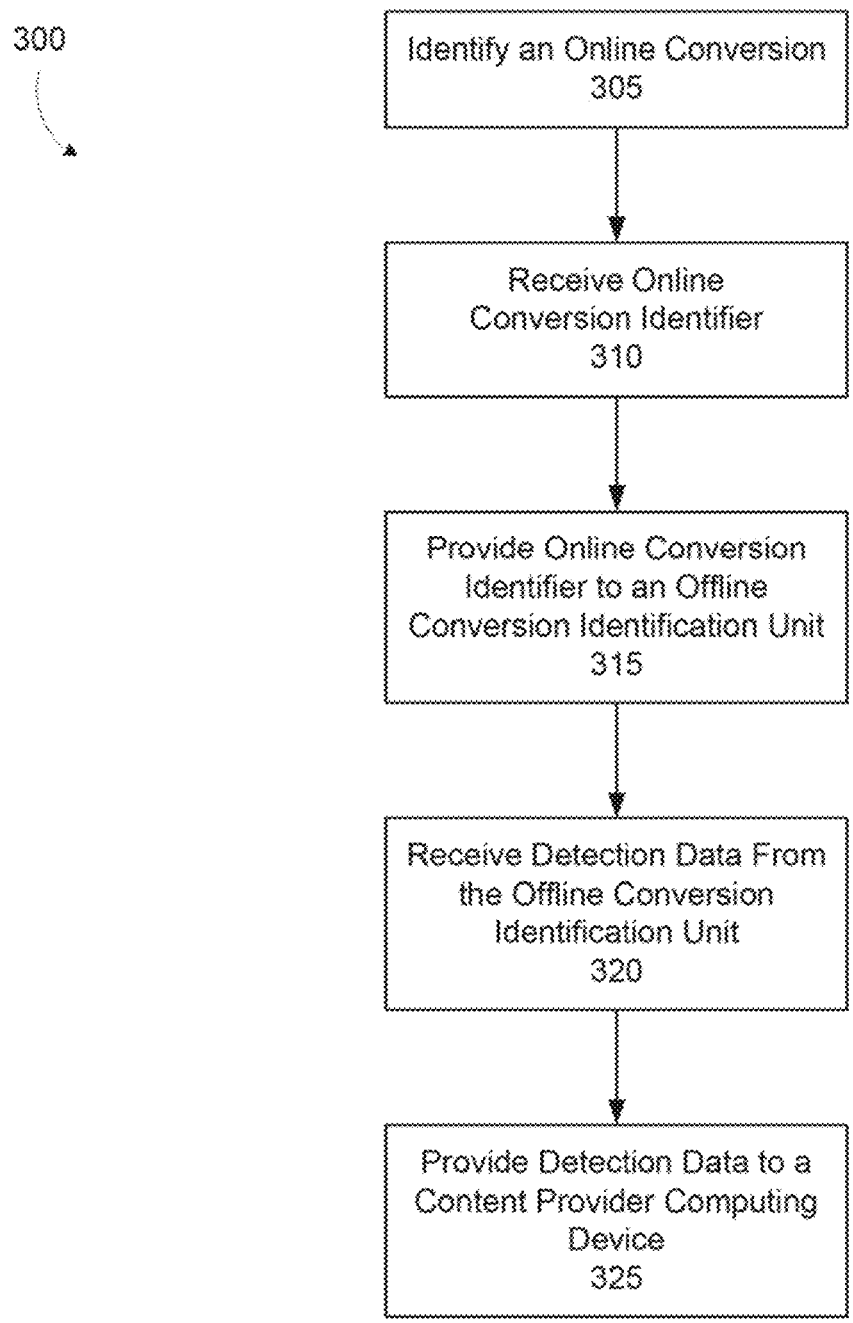
FIG. 3 is a flow diagram depicting an example method of correlating online conversions with offline conversions, according to an illustrative implementation.

FIG. 3 depicts an example computer implemented method 300 of correlating online conversions with offline conversions. The method 300 can identify an online conversion executed by the first computing device 135 (ACT 305). The method 300 can receive an online conversion identifier (ACT 310). The method 300 can provide the online conversion identifier to the offline conversion identification unit 140 (ACT 315). The method 300 can receive detection data from the offline conversion identification unit 140 (ACT 320). The method 300 can provide detection data to the content provider computing device 130 (ACT 325).

The method 300 can identify an online conversion executed by the first computing device 135 (ACT 305). The online conversion results from interaction with a piece of content in an online document rendered on the first computing device 135. The online conversion can be a click, an item added to an online shopping cart, or an online purchase. The online conversion can also be any other type of detectable online behavior defined by the content provider including a mouse over or a scroll over. The online conversion can represent an interaction between a user using the first computing device 135 and the content provided by the content provider computing device 130. The content can be an advertisement, link, embedded video, Flash object, banner, pop-up, pixel, or any combination thereof.

The method 300 can receive, by the data processing system 110, an online conversion identifier generated on the first computing device 135 (ACT 310). The online conversion identifier can include one or more of a device type of the first computing device 135, an operating system running on the first computing device 135, an advertisement type associated with the online conversion, a keyword associated with the online conversion, a query associated with the online conversion, and a time of the online conversion. The First computing device 135 can transmit the online conversion identifier to the data processing system 110.

The method 300 can provide the online conversion identifier to the offline conversion identification unit 140 (ACT 315). The first computing device 135 can transmit the online conversion identifier to the data processing system 110 via network 105. The data processing system 110 can transmit the online conversion identifier to the offline conversion detection unit 140. In some implementations, the data processing system 110 can transmit the online conversion identifier to the second computing system 145. In some implementations, the first computing system 135 can transmit the online conversion identifier directly to the second computing system 145. In some implementations, the first computing device 135 transmits the online conversion identifier to the second computing device 145 via a third-party data processing system, computing device, server, or the like. In this manner, the offline detection unit 140 can detect the online conversion identifier on the computing system 135 or 145.

The method 300 can receive detection data from the offline conversion identification unit 140 (ACT 320). The offline conversion identification unit 140 can maintain in its memory the online conversion identifier. The online conversion identifier can be maintained for a predetermined amount of time, e.g., 7, 10, or 30 days, or indefinitely. The offline conversion identification unit 140 can be disposed in a physical space such as a retail store 205. The offline conversion identification unit 140 can include a wireless communication interface employing a protocol such as WiFi, Bluetooth™, or the like to communicate with a computing device 135 or 145 that enters the physical space. When the offline conversion identification unit 140 communicates with a computing device 135 or 145, the latter can transmit an online conversion identifier that is stored in its memory. The offline conversion identification unit 140 can compare the online conversion identifier with the online conversion identifier stored in its memory. If the offline conversion identification unit 140 detects a match, it can generate detection data, and transmit that detection data via the network 105 to the data processing system 110.

The method 300 can provide detection data to the content provider computing device 130 (ACT 325). The data processing system 110 can transmit the detection data as raw data (i.e., basic information about the online conversion identifier plus the time, date, and location of the detection) to the content provider computing device 130. Additionally or alternatively, the data processing system 110 can collect and analyze detection data in aggregate, and transmit measurements, tables, summaries, graphs, or the like to the content provider computing device 130. The data processing system 110 can provide the detection data automatically either on receipt of new detection data or periodically on a predetermined schedule. Alternatively, the data processing system 110 can maintain the detection data in the database 125 until the content provider computing device 130 requests it. Although a single content provider computing device 130 is shown for simplicity, it is possible to return the detection data to a different content provider computing device 130 without departing from the scope of this disclosure.

Figure 4:
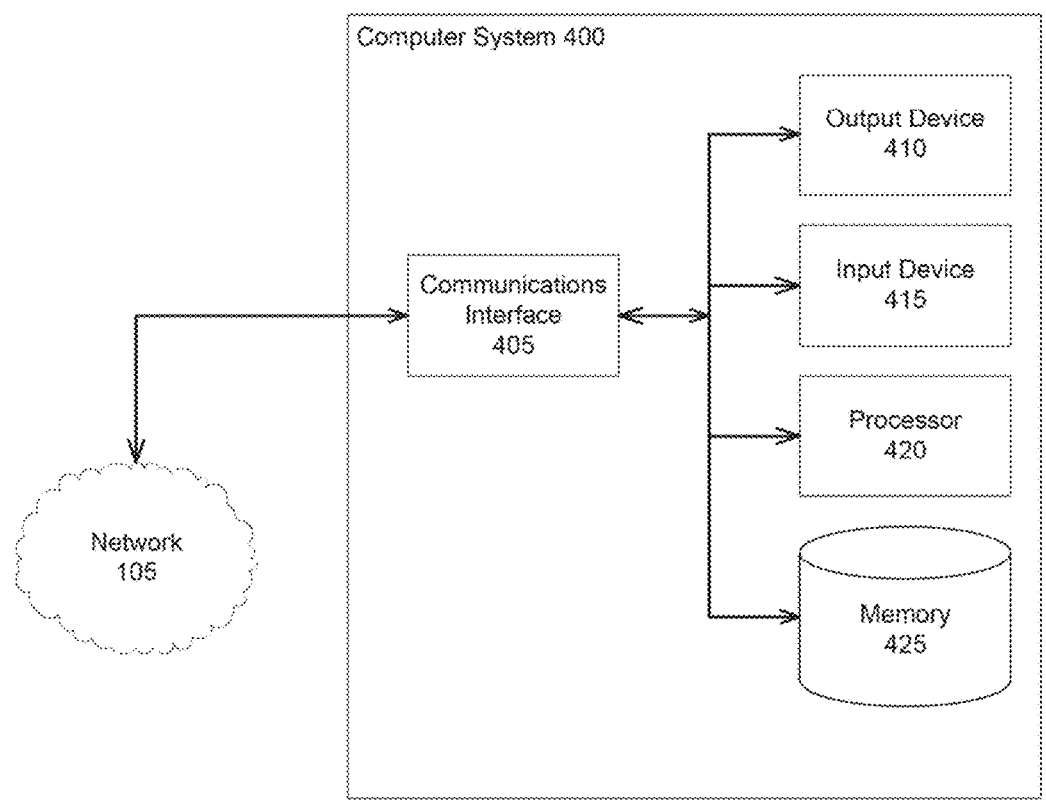
FIG. 4 is a block diagram illustrating a general architecture for a computer system that may be employed to implement elements of the systems and methods described and illustrated herein, according to an illustrative implementation.

FIG. 4 shows the general architecture of an illustrative computer system 400 that may be employed to implement any of the computer systems discussed herein (including the system 100 and its components such as the data processing system 110, the online conversion detection module 115, and the conversion correlation module 120) in accordance with some implementations. The computer system 400 can be used to provide information via the network 105; for example, to correlate an online conversion with an offline conversion, and provide that information to the content provider computing device 130 via the network 105. The computer system 400 includes one or more processors 420 communicatively coupled to at least one memory 425, one or more communications interfaces 405, one or more output devices 410 (e.g., one or more display units) or one or more input devices 415 (e.g., one or more touchscreens, keypads, microphones, or the like). The processors 420 can be included in the data processing system 110 or the other components of the system 100 such as the online conversion detection module 115 or the conversion correlation module 120.

The memory 425 can include computer-readable storage media, and can store computer instructions such as processor-executable instructions for implementing the operations described herein. The online conversion detection module 115, or the conversion correlation module 120, or the database 125 can include the memory 425 to store the online conversion identifier received from the first computing device 135 or the detection data received from the offline conversion identification unit 140, for example. The at least one processor 420 can execute instructions stored in the memory 425 and can read from or write to the memory information processed and or generated pursuant to execution of the instructions.

The processors 420 can be communicatively coupled to or control the at least one communications interface 405 to transmit or receive information pursuant to execution of instructions. For example, the communications interface 405 can be coupled to a wired or wireless network, bus, or other communication means and can allow the computer system 400 to transmit information to or receive information from other devices (e.g., other computer systems). One or more communications interfaces 405 can facilitate information flow between the components of the system 100. In some implementations, the communications interface 405 can (e.g., via hardware components or software components) provide a website as an access portal to at least some aspects of the computer system 400. Examples of communications interfaces 405 include user interfaces.

The output devices 410 can allow information to be viewed or perceived in connection with execution of the instructions. The input devices 415 can allow a user to make manual adjustments, make selections, enter data or other information, or interact in any of a variety of manners with the processor during execution of the instructions.

The subject matter and the operations described herein can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more modules of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing system or apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices). The operations described in this specification can be implemented as operations performed by a data processing apparatus on data stored on one or more computer-readable storage devices or received from other sources.

For situations in which the systems discussed herein collect personal information about users, or may make use of personal information, the users may be provided with an opportunity to control whether programs or features that may collect personal information (e.g., information about a user's social network, social actions or activities, a user's preferences, or a user's location), or to control whether or how to receive content from a content server or other data processing system that may be more relevant to the user. In addition, certain data may be anonymized in one or more ways before it is stored or used, so that personally identifiable information is removed when generating parameters. For example, a user's identity may be anonymized so that no personally identifiable information can be determined for the user, or a user's geographic location may be generalized where location information is obtained (such as to a city, postal code, or state level), so that a particular location of a user cannot be determined. Thus, the user may have control over how information is collected about him or her and used by the content server.

The term "data processing system" or "computing device" "module" "engine" or "component" encompasses apparatuses, devices, and machines for processing data, including by way of example a programmable processor, a computer, a system on a chip, or multiple ones, or combinations, of the foregoing. The apparatuses can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination thereof. The apparatus and execution environment can realize various different computing model infrastructures, such as web services, distributed computing and grid computing infrastructures. The online conversion detection module 115 or the conversion correlation module 120 can include or share one or more data processing apparatuses, systems, computing devices, or processors.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 110) to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

The subject matter described herein can be implemented in a computing system that includes a back-end component, e.g., as a data server, or that includes a middleware component, e.g., an application server, or that includes a front-end component, e.g., a client computer having a graphical user interface or a web browser through which a user can interact with an implementation of the subject matter described in this specification, or a combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 100 or system 400 can include clients and servers. A client and server are generally remote from each other and typically interact through a communication network (e.g., the network 105). The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server (e.g., received by the data processing system 110 from the first computing device 135 or the content provider computing device 130).

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product. For example, the online conversion detection module 115 or the conversion correlation module 120 can be a single module, a logic device having one or more processing circuits, or part of one or more servers of the data processing system 110.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "an alternate implementation," "various implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A system to correlate network activity among different client devices, comprising:
  a data processing system having one or more processors to:
    receive an online conversion identifier generated by a first client device of a first device type corresponding to a digital assistant, the online conversion identifier uniquely identifying an interaction between the first client device and a content item via a microphone input interface of the first client device, the content item associated with a content provider, the online conversion identifier including at least one of the first device type of the first client device, an application profile, a parameter of the interaction, and a time of the interaction;
    transmit, to a second client device of a second device type different from the first device type of the first client device prior to a visit to a physical space associated with the content provider, the online conversion identifier uniquely identifying the interaction between the first client device and the content item via the microphone input interface of the first client device, the second client device and the first client device associated with a shared account login;
    transmit, to an offline conversion identification unit disposed in the physical space associated with the content provider, the online conversion identifier uniquely identifying the interaction between the first client device and the content item via the microphone input interface of the first client device, to cause the offline conversion identification unit to:
obtain the online conversion identifier,
detect that the second client device is within a threshold distance of the offline conversion identification unit,
determine that the second client device stores the online conversion identifier that matches the online conversion identifier stored at the offline conversion identification unit, and
transmit, responsive to the determination, detection data indicating that the offline conversion identification unit detected that the online conversion identifier corresponds to the second client device;
receive, from the offline conversion identification unit, the detection data indicating that the offline conversion identification unit has detected, on the second client device, the online conversion identifier uniquely identifying the interaction between the first client device and the content item via the microphone input interface of the first client device; and
transmit the detection data to a content provider computing device associated with the content provider.

2. The system of claim 1, comprising:
the data processing system to receive, from the offline conversion identification unit, the detection data indicating that the offline conversion identification unit has detected the online conversion identifier on the second client device in relation to a point-of-sale device associated with the offline conversion identification unit.

3. The system of claim 1, wherein the second client device includes a mobile computing device.

4. The system of claim 1, wherein the second device type comprises a mobile computing device.

5. The system of claim 1, wherein the physical space includes a retail location of the content provider, and the detection data indicates that the second client device is within the threshold distance from the offline conversion identification unit at the physical space.

6. The system of claim 1, wherein the offline conversion identification unit is associated with a point-of-sale device.

7. The system of claim 6, comprising:
the data processing system to receive the detection data, the detection data indicating that an in-store purchase associated with one of the first client device or the second client device has occurred.

8. The system of claim 1, comprising:
the offline conversion identification unit to establish a wireless connection with the second client device to detect the online conversion identifier.

9. The system of claim 8, wherein the detection data comprises one or more of information relating to the first client device or information relating to the online conversion identifier.

10. The system of claim 1, comprising:
the data processing system to receive the detection data, the detection data indicating that the detection occurred within a predetermined period of time since the online conversion identifier.

11. A method of correlating network activity among different client devices, comprising:
receiving, by a data processing system comprising one or more processors, an online conversion identifier generated by a first client device of a first device type corresponding to a digital assistant, the online conversion identifier uniquely identifying an interaction between the first client device and a content item via a microphone input interface of the first client device, the content item associated with a content provider, the online conversion identifier including at least one of the first device type of the first client device, an application profile, a parameter of the interaction, and a time of the interaction;
transmitting, by the data processing system to a second client device of a second device type different from the first device type of the first client device, prior to a visit to a physical space associated with the content provider, the online conversion identifier uniquely identifying the interaction between the first client device and the content item via the microphone input interface of the first client device, the second client device and the first client device associated with a shared account login;
transmitting, by the data processing system to an offline conversion identification unit disposed in the physical space associated with the content provider, the online conversion identifier uniquely identifying the interaction between the first client device and the content item via the microphone input interface of the first client device, to cause the offline conversion identification unit to:
obtain the online conversion identifier,
detect that the second client device is within a threshold distance of the offline conversion identification unit,
determine that the second client device stores the online conversion identifier that matches the online conversion identifier stored at the offline conversion identification unit, and
transmit, responsive to the determination, detection data indicating that the offline conversion identification unit detected that the online conversion identifier corresponds to the second client device;
receiving, by the data processing system from the offline conversion identification unit, the detection data indicating that the offline conversion identification unit has detected, on the second client device, the online conversion identifier uniquely identifying the interaction between the first client device and the content item via the microphone input interface of the first client device; and
transmitting, by the data processing system, the detection data to a content provider computing device associated with the content provider.

12. The method of claim 11, wherein the second client device includes a mobile computing device.

13. The method of claim 11, wherein the second device type comprises a mobile computing device.

14. The method of claim 11, wherein the physical space includes a retail location of the content provider, and the detection data indicates that the second client device is within the threshold distance from the offline conversion identification unit at the physical space.

15. The method of claim 11, wherein the offline conversion identification unit is associated with a point-of-sale device.

16. The method of claim 15, comprising:
receiving, by the data processing system, the detection data, the detection data indicating that an in-store purchase associated with the second client device has occurred.

17. The method of claim 11, comprising:
receiving, by the data processing system, the detection data, the detection data indicating that the detection occurred within a predetermined period of time since the online conversion identifier.

18. The method of claim 11, comprising:

receiving, by the data processing system from the offline conversion identification unit, the detection data indicating that the offline conversion identification unit has detected the online conversion identifier on the second client device in relation to a point-of-sale device associated with the offline conversion identification unit.

* * * * *